United States Patent
Horn et al.

(10) Patent No.: US 8,640,313 B2
(45) Date of Patent: Feb. 4, 2014

(54) MACHINE TOOL WITH FEED AND REMOVAL DEVICE

(75) Inventors: Wolfgang Horn, Goppingen (DE); Joachim Krischke, Mosbach (DE); Horst Schmauder, Metzingen-Glems (DE)

(73) Assignee: MAG IAS GmbH, Göppingen (DE)

( * ) Notice: Subject to any disclaimer, the term of this patent is extended or adjusted under 35 U.S.C. 154(b) by 758 days.

(21) Appl. No.: 12/922,363

(22) PCT Filed: Mar. 9, 2009

(86) PCT No.: PCT/EP2009/001661
§ 371 (c)(1),
(2), (4) Date: Nov. 8, 2010

(87) PCT Pub. No.: WO2009/115204
PCT Pub. Date: Sep. 24, 2009

(65) Prior Publication Data
US 2011/0052341 A1 Mar. 3, 2011

(30) Foreign Application Priority Data
Mar. 18, 2008 (DE) .................. 10 2008 014 781

(51) Int. Cl.
*B23Q 7/02* (2006.01)
*B23C 1/14* (2006.01)
*B23Q 16/00* (2006.01)
*B23Q 1/25* (2006.01)

(52) U.S. Cl.
USPC .......... 29/33 P; 409/168; 409/173; 198/346.1

(58) Field of Classification Search
USPC ........... 29/563, 33 P; 409/159, 161, 172, 173, 409/168; 198/345.3, 346.1; 483/14–15
See application file for complete search history.

(56) References Cited

U.S. PATENT DOCUMENTS 4,712,282 A * 12/1987 Romeu .......................... 29/33 P
8,505,894 B2 * 8/2013 Takahashi et al. ............. 29/33 P
(Continued)

FOREIGN PATENT DOCUMENTS

| EP | 1201354 B1 | 5/2002 |
| EP | 1375057 A1 | 1/2004 |
| EP | 1747843 A1 | 1/2007 |

OTHER PUBLICATIONS

PCT/EP2009/001661 International Search Report, English language, Mailed Jun. 12, 2009, 4 pages.
(Continued)

*Primary Examiner* — Erica E Cadugan
(74) *Attorney, Agent, or Firm* — Reising Ethington P.C.

(57) ABSTRACT

A machine tool has a tool spindle which can be moved in an x-direction and a y-direction and a workpiece slide which can be moved in the z-direction and has a swiveling table which can be pivoted about an A-axis which is parallel to the x-axis. A feed and removal device is provided, which has an H-shaped pallet changing mechanism, which can be pivoted about a y1-axis which is parallel to the y-direction, a y1-pivot drive and a lift drive for displacing the pallet changing mechanism from a lower feed and removal position into a central pallet depositing position and into an upper pallet lifting out position.

4 Claims, 7 Drawing Sheets

(56) References Cited

U.S. PATENT DOCUMENTS

| | | |
|---|---|---|
| 2004/0047700 A1 | 3/2004 | Maeda |
| 2006/0153654 A1 | 7/2006 | Chang |
| 2007/0289115 A1 | 12/2007 | Kawai et al. |
| 2011/0070044 A1* | 3/2011 | Kawada et al. ............... 409/162 |

OTHER PUBLICATIONS

PCT/EP2009/001661 Written Opinion and International Search Report, Mailed Jun. 12, 2009, 13 pages.

DE10 2008 014 781.8-14 German Examination Report, Nov. 20, 2008, 4 pages.

* cited by examiner

MACHINE TOOL WITH FEED AND REMOVAL DEVICE

FIELD OF THE INVENTION

The invention relates to a machine tool with a feed and removal device.

BACKGROUND OF THE INVENTION

Combinations of this type of a respective machine tool with a feed and removal device are known in practice and widespread. The machine tool here has a tool spindle which can be moved in the horizontal x-direction and vertical y-direction and a workpiece slide, which is movable in the z-direction. The feed and removal device has an H-shaped pallet changing mechanism, which can be pivotably driven about a vertical y1-axis. The work sequence here is such that arranged on one pair of arms of the pallet changing mechanism is a removable pallet, on which an operator deposits a workpiece to be machined. A pallet with a workpiece has been deposited on the workpiece slide by the other, diametrically opposing pair of arms and is machined. After machining, the pallet with the machined workpiece is lifted off from the workpiece slide by the pair of arms of the pallet changing mechanism. The pallet changing mechanism is pivoted through 180°, so the still unmachined workpiece mentioned arrives in the region of the workpiece slide. The pallet with the workpiece to be machined is deposited on the workpiece slide. The machined workpiece is located in front of the machine. The operator removes it from the pallet and deposits a new workpiece to be machined on the pallet. The cycle mentioned is then repeated. A combination of this type of machine tool with a feed and removal device is known, for example, from EP 1 201 354 B1.

If, in this known combination of machine tool and feed and removal device, a further axis, namely a swiveling table which can be pivoted about an A-axis, is to be provided on the workpiece slide, this leads to the fact that the workpiece itself is arranged higher in the machine tool. This makes the described feed difficult. If the feeding of the machine takes place using a robot, then this would be unproblematic. If, however, the depositing of a workpiece to be machined on the corresponding pallet is to be carried out by hand, or else if the machine is installed in a transfer line, in which the workpieces are transported on the lower level, described above, the arrangement of the swiveling table leads to handling problems during the feeding and removal of workpieces.

SUMMARY OF THE INVENTION

The invention is therefore based on the object of configuring the above-mentioned combination of machine tool and feed and removal device in a simple manner in such a way that a feeding with and removal of workpieces is also possible in a simple manner when a swiveling table is provided on the workpiece slide.

This object is achieved according to the invention by a machine tool, with a tool spindle which is movable in a horizontal x-direction and a vertical y-direction, with a workpiece slide which is movable in a horizontal z-direction which is perpendicular to the x-direction and y-direction, which workpiece slide has a swiveling table which is pivotable about a horizontal A-axis which is parallel to the x-axis, and is designed to receive a workpiece pallet, with a feed and removal device, which has an H-shaped pallet changing mechanism which is pivotable about a y1-axis which is parallel to the vertical y-direction, and which has two pairs of spaced apart and mutually parallel arms, which are provided with supports for a pallet, which has a y1-pivot drive for pivoting the pallet changing mechanism about the y1-axis and which has a lift drive for displacing the pallet changing mechanism from a lower feed and removal position into a central pallet depositing position and into an upper pallet lifting out position and with a free space which is formed below the swiveling table on the workpiece slide and is formed to receive a part of a pair of arms of the pallet changing mechanism in its lower feed and removal position. It is achieved by the measures according to the invention that the workpiece to be machined can be lifted by a simple additional lift movement from a lower feed and removal position into a central workpiece depositing position, in which the pallet changing mechanism can be moved relative to the workpiece slide into the latter.

The space requirement for the pallet changing mechanism and the workpiece slide in the z-direction is reduced without particular additional measures, because the pallet changing mechanism can be partially located in the workpiece slide during the machining of the workpiece.

Further advantages, features and details of the invention are apparent from the description of an embodiment with the aid of the drawings.

DESCRIPTION OF THE PREFERRED EMBODIMENT

Figure 1:
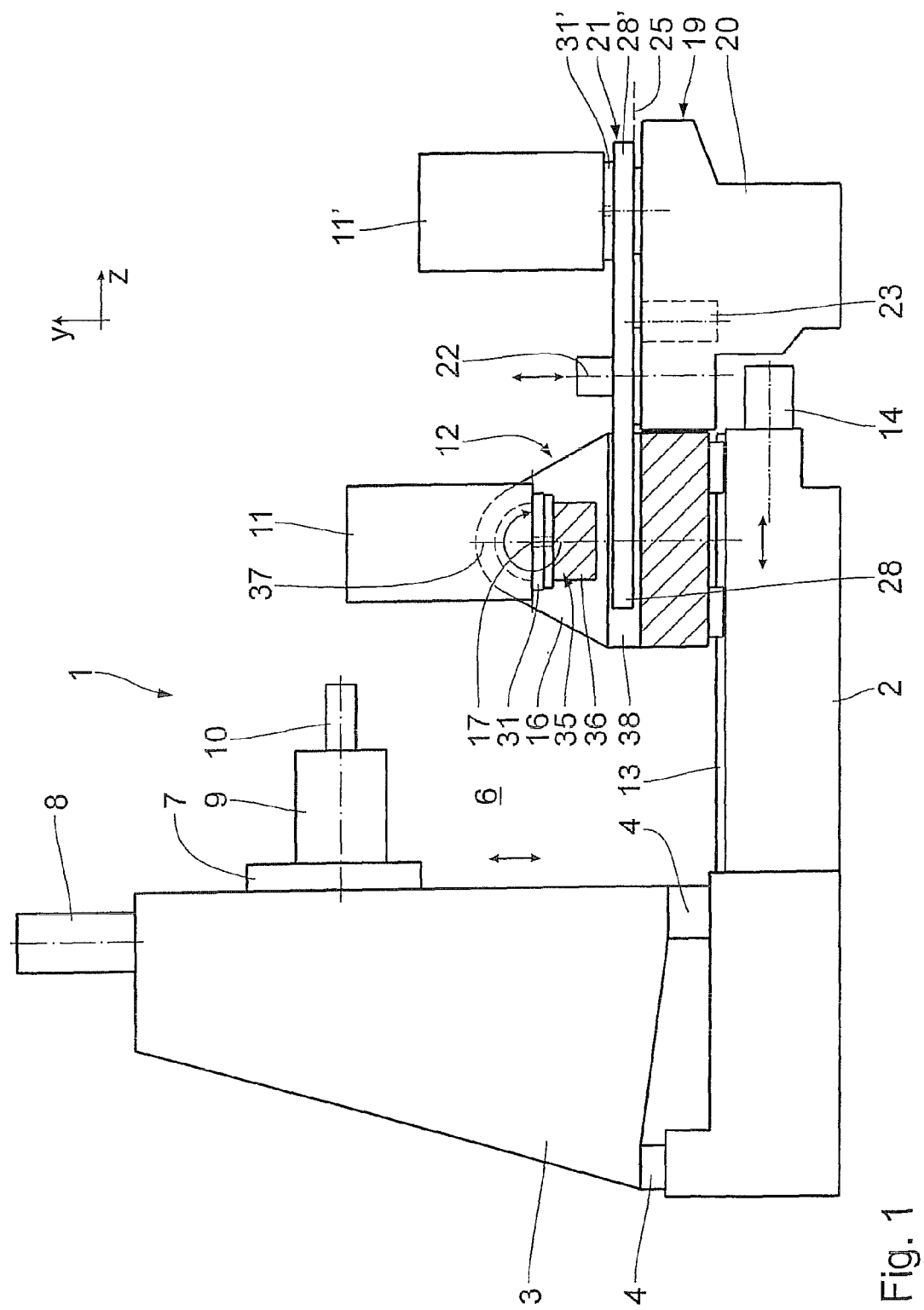
FIG. 1 shows the combination of a machine tool with a feed and removal device in a machining position in a side longitudinal view.

The machine tool 1 shown in the drawing has a machine bed 2, on which a stand 3 being used as an x-slide can be displaceably guided on x-guide rails 4 by means of an x-drive motor 5 in a horizontal x-direction. On the front side of the stand 3 facing the working space 6, a y-slide 7 is displaceably guided in a vertical y-direction by means of a y-drive motor 8. A rotatably drivable tool spindle 9, which extends in the horizontal z-direction to the working space 6, is in turn mounted on the y-slide 7. The tool spindle 9 can receive a tool 10 to machine a workpiece 11 or 11'. The z-direction is perpendicular to the plane spanned by the x-direction and the y-direction. A workpiece slide 12 is displaceably guided on z-guide rails 13 by means of a z-drive motor 14 on the machine bed 2. To the extent that the machine tool 1 has been described up to now, it is generally known and conventional in practice.

A so-called swiveling table 15 is pivotably mounted on the workpiece slide 12 between slide cheeks 16 of the workpiece slide 12 about an A-axis 17 which is parallel to the x-direction. The pivot drive takes place by means of an A-pivot drive 18.

The stand 3 delimits the working space 6 to the rear. Provided on the front side of the machine tool 1, which is remote from the stand 3, is a feed and removal device 19, which is a so-called pallet changer. It has a base frame 20, on which an H-shaped pallet changing mechanism 21 is pivotably arranged about a vertical y1-axis 22 which is parallel to the y-axis. The pivoting movements take place by means of a y1-pivot drive 23. Moreover, the pallet changing mechanism 21 can be adjusted in the direction of the y1-axis 22 by means of a lift drive 24, specifically between three positions, namely a lower feed and removal position 25, a central raised pallet depositing position 26 and an upper pallet lifting out position 27.

The H-shaped pallet changing mechanism 21 has two mutually diametrically opposing pairs of arms 28, 28' which are arranged mirror-symmetrically to the y1-axis 22 and on which four respective supports 29 are formed, which in each case have a centering bore 30. A pallet 31 or 31' can be deposited on these supports 29 of each pair of arms 28, 28', which pallet, on its lower side, has centering pins 32 which correspond to the centering bores 30 with regard to the arrangement and engage in the centering bores 30 when a pallet 31 or 31' is deposited on the supports 29, so the respective pallet 31 or 31' is arranged precisely positioned on the pallet changing mechanism 21 and is secured against sliding.

Provided on the lower side of each pallet 31 or 31' are receivers 33, which, when the pallet 31, 31' is deposited on the swiveling table 15, are placed on conical clamping mechanisms 34, by means of which the pallet 31 or 31' is precisely oriented relative to the swiveling table 15 and tightly clamped.

If necessary, the clamping mechanisms 34 on the swiveling table 15 may be arranged on a pivoting mechanism 35, merely indicated, which is integrated in the swiveling table 15 and can be pivoted by means of a B-pivot drive 36 about a vertical B-axis 37 which is parallel to the y-direction. Formed directly below the swiveling table 15 is a free space 38, which is so high that it can receive the arms 28 or 28' without a collision occurring between the swiveling table 15 and the arms 28, 28'.

Figure 2:
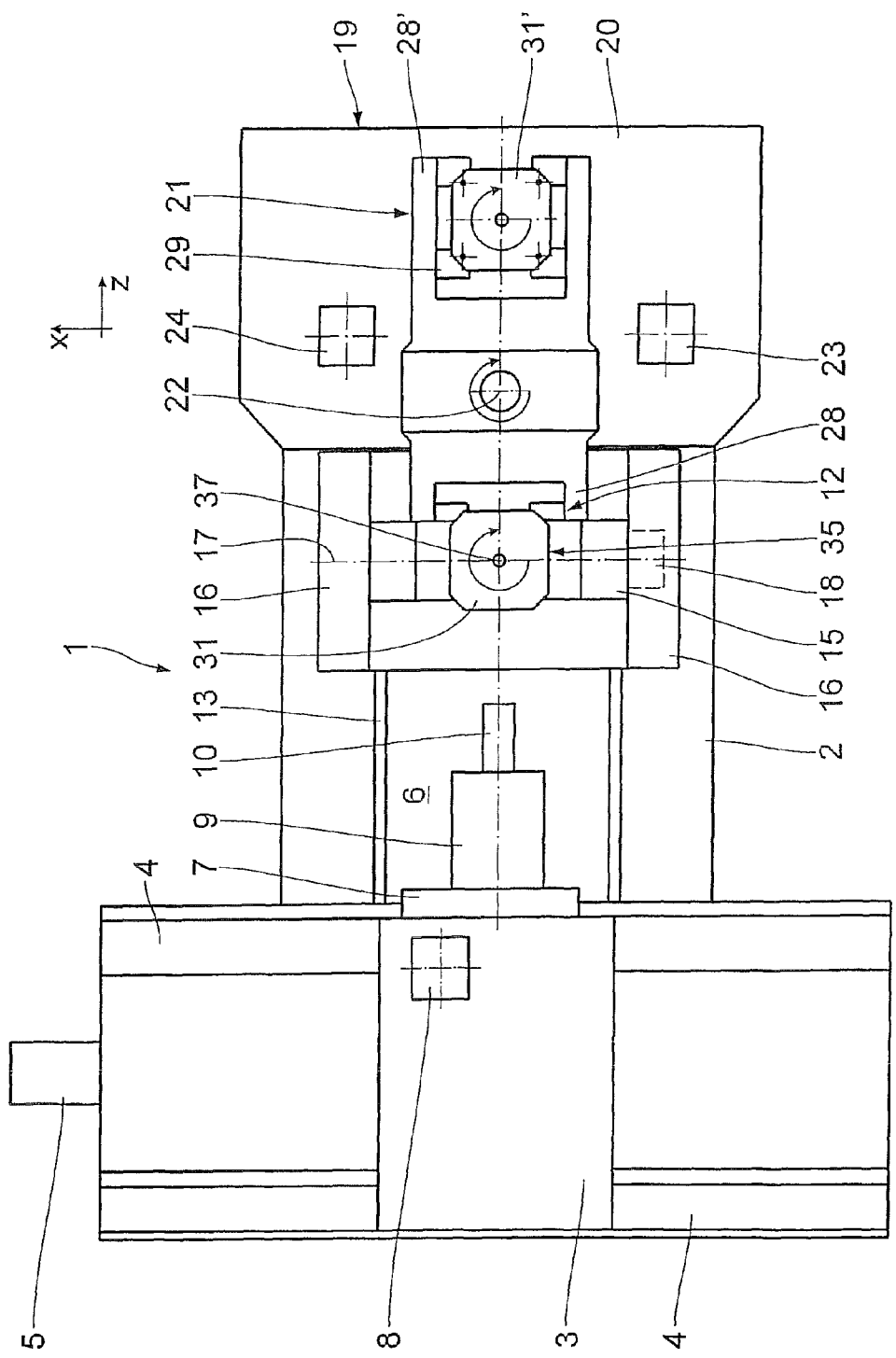
FIG. 2 shows the combination according to FIG. 1 in a plan view.

The mode of working is as follows:

A machining situation shown in FIGS. 1 and 2 is assumed, in which a pallet 31 with a workpiece 11 is located on the swiveling table 15 and is machined by means of the tool 10, it being possible for the tool 10 which is rotatably driven about the z-axis to be moved in the conventional manner in the x- and y-direction. In contrast, the workpiece 11 is moved in the z-direction and pivoted about the A-axis 17 and optionally about the B-axis 37 during machining. As FIGS. 1 and 2 show, one pair of arms 28, by means of which the pallet 31 with the workpiece 11 was supplied to the swiveling table 15, is located here below the swiveling table 15 in the lower feed and removal position 25, so the swiveling table 15 and therefore also the workpiece slide 12 are free of the associated arms 28 of the pallet changing mechanism 21. The pair of arms 28, during the machining of the workpiece 11, thus remains at least partially in the workpiece slide 12.

Figure 3:
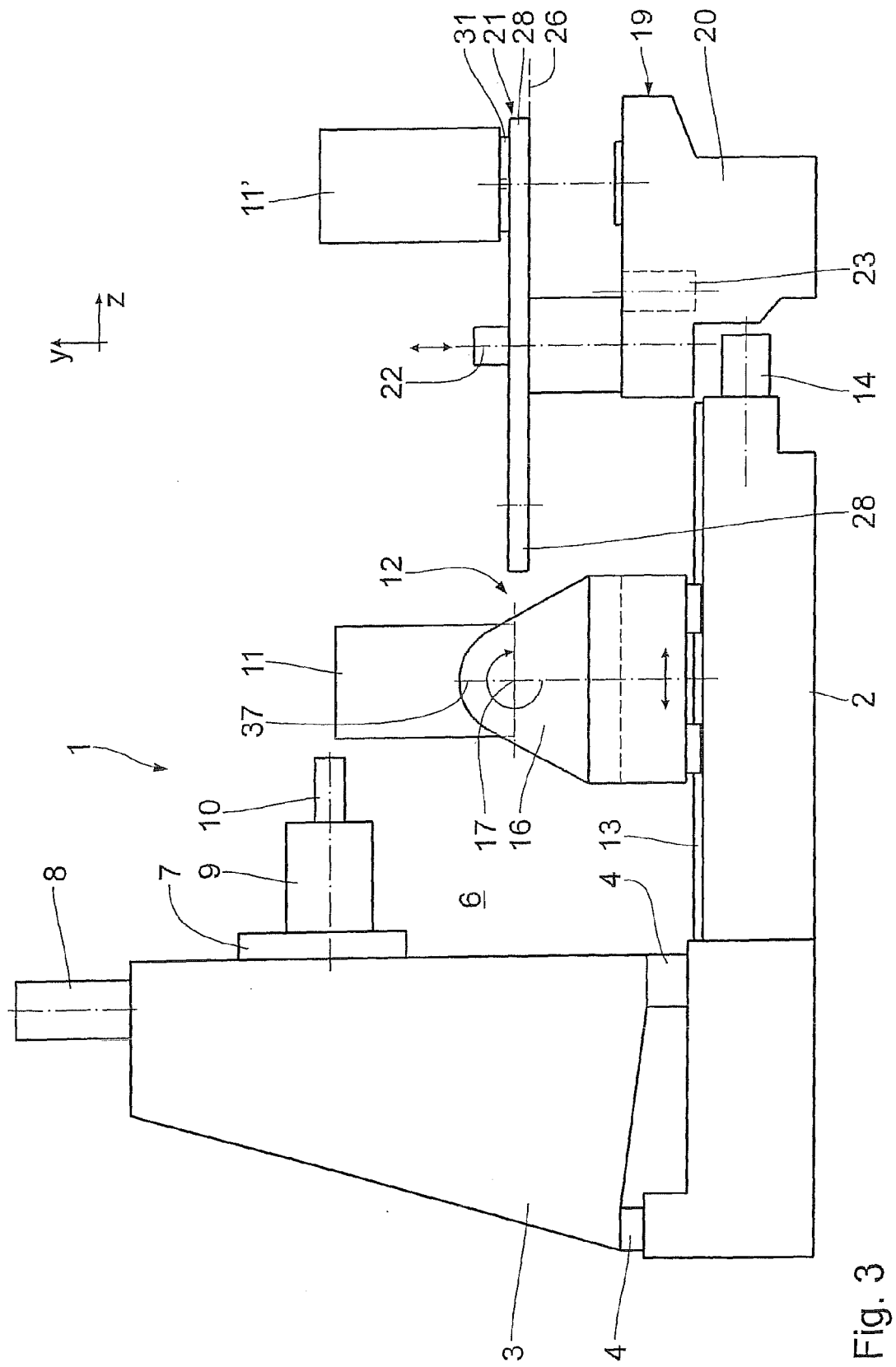
FIG. 3 shows the combination according to FIG. 1 in a position for preparation for a pallet change.
Figure 4:
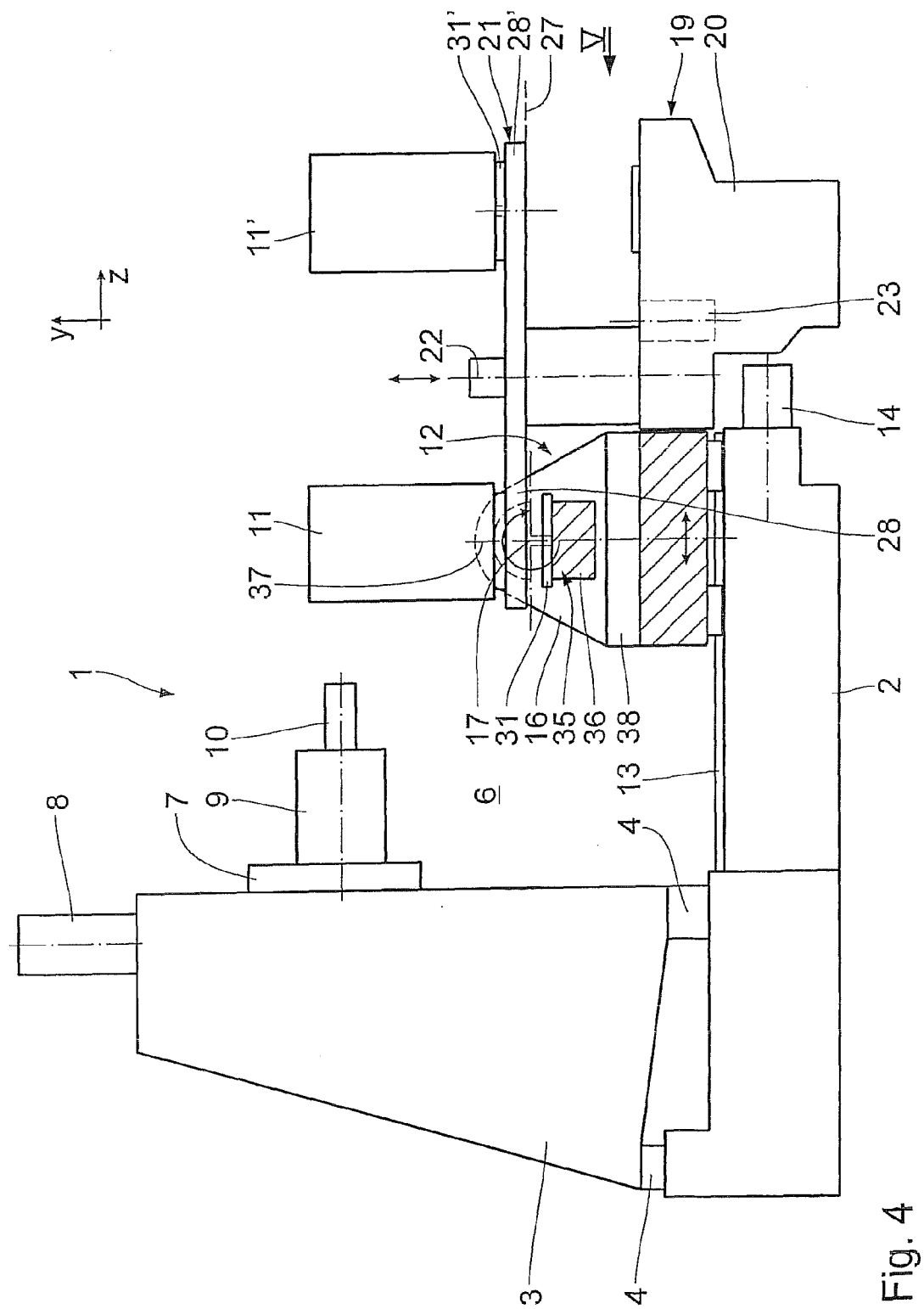
FIG. 4 shows the combination according to FIG. 1 during a pallet change.
Figure 5:
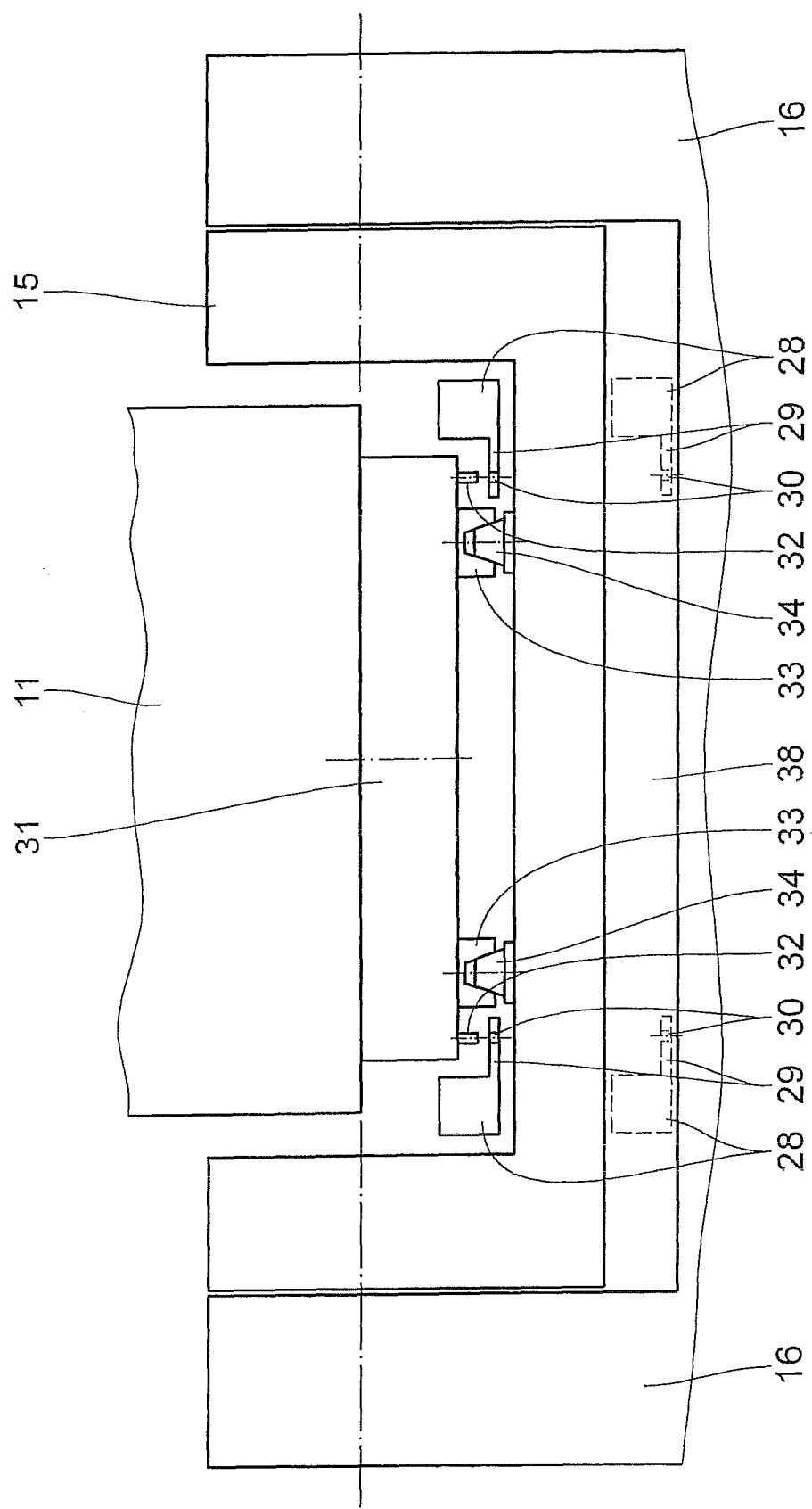
FIG. 5 shows a part end view of the combination according to FIG. 4 in a view in accordance with the viewing arrow V in FIG. 4.

On conclusion of the machining of the workpiece 11, the workpiece slide 12 moves in accordance with FIG. 3 in the direction of the stand 3 to such an extent that the pallet changing mechanism 21 is disengaged from the workpiece slide 12. Obviously, the tool spindle 9 with the tool 10 has to be brought out of the collision region with the machined workpiece 11. Following this, the pallet changing mechanism 21 is moved up into the central pallet depositing position 26, as can be inferred from FIG. 3. Thereupon—in accordance with the view in FIG. 4—the workpiece slide 12 is displaced again in the z-direction toward the pallet changing mechanism 21, so the pair of arms 28, in accordance with the view in FIGS. 4 and 5, is introduced between the pallet 31 with the workpiece 11 and the swiveling table 15. Following this, the pallet changing mechanism 21—still in accordance with the view in FIG. 4—is moved into the upper pallet lifting out position 27 and lifts the pallet 31 with the machined workpiece 11 from the clamping mechanisms 34, with the centering pins 32 simultaneously engaging in the centering bores 30 of the supports 29.

Figure 6:
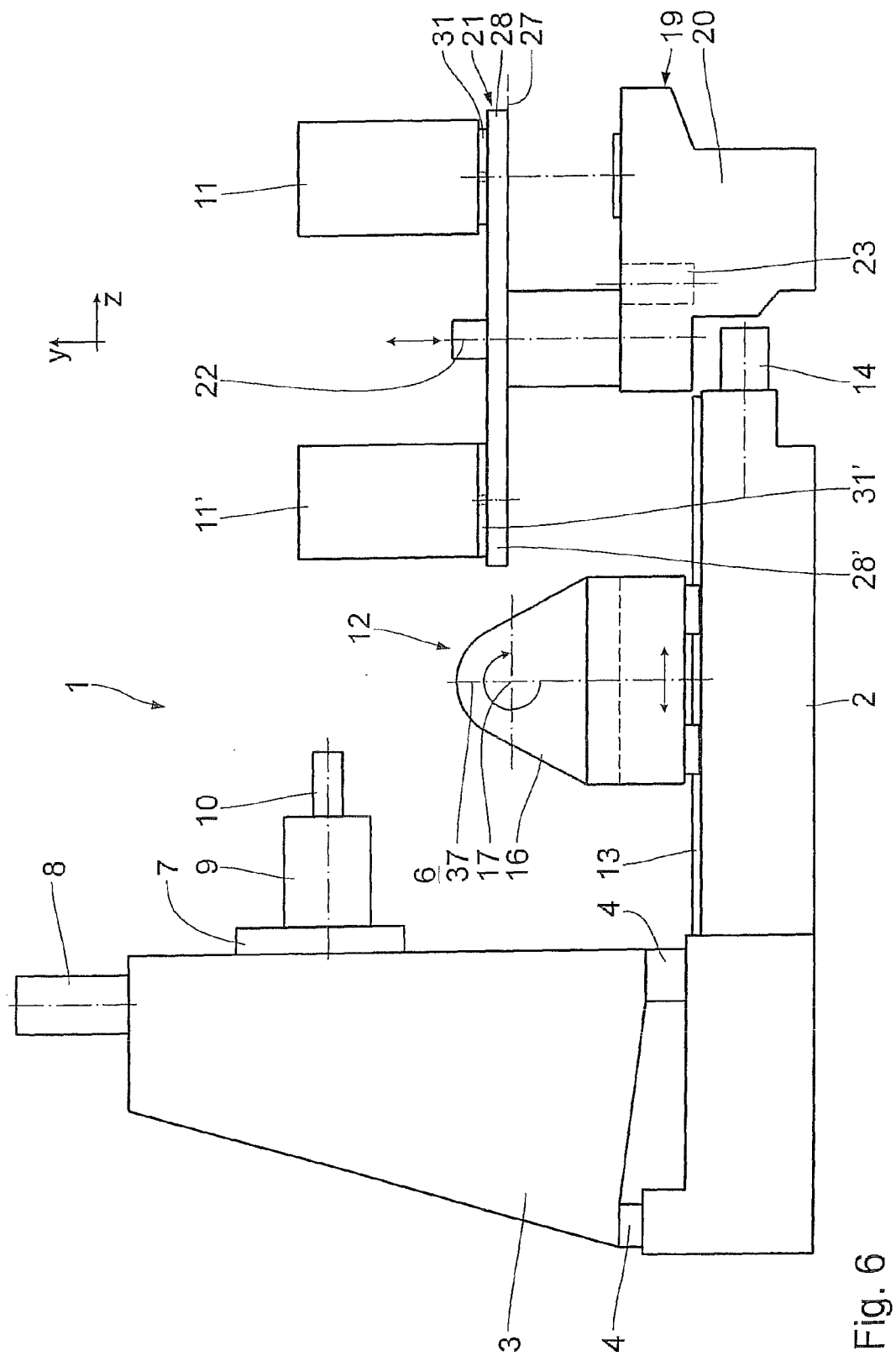
FIG. 6 shows the combination according to FIG. 1 during a pallet change.
Figure 7:
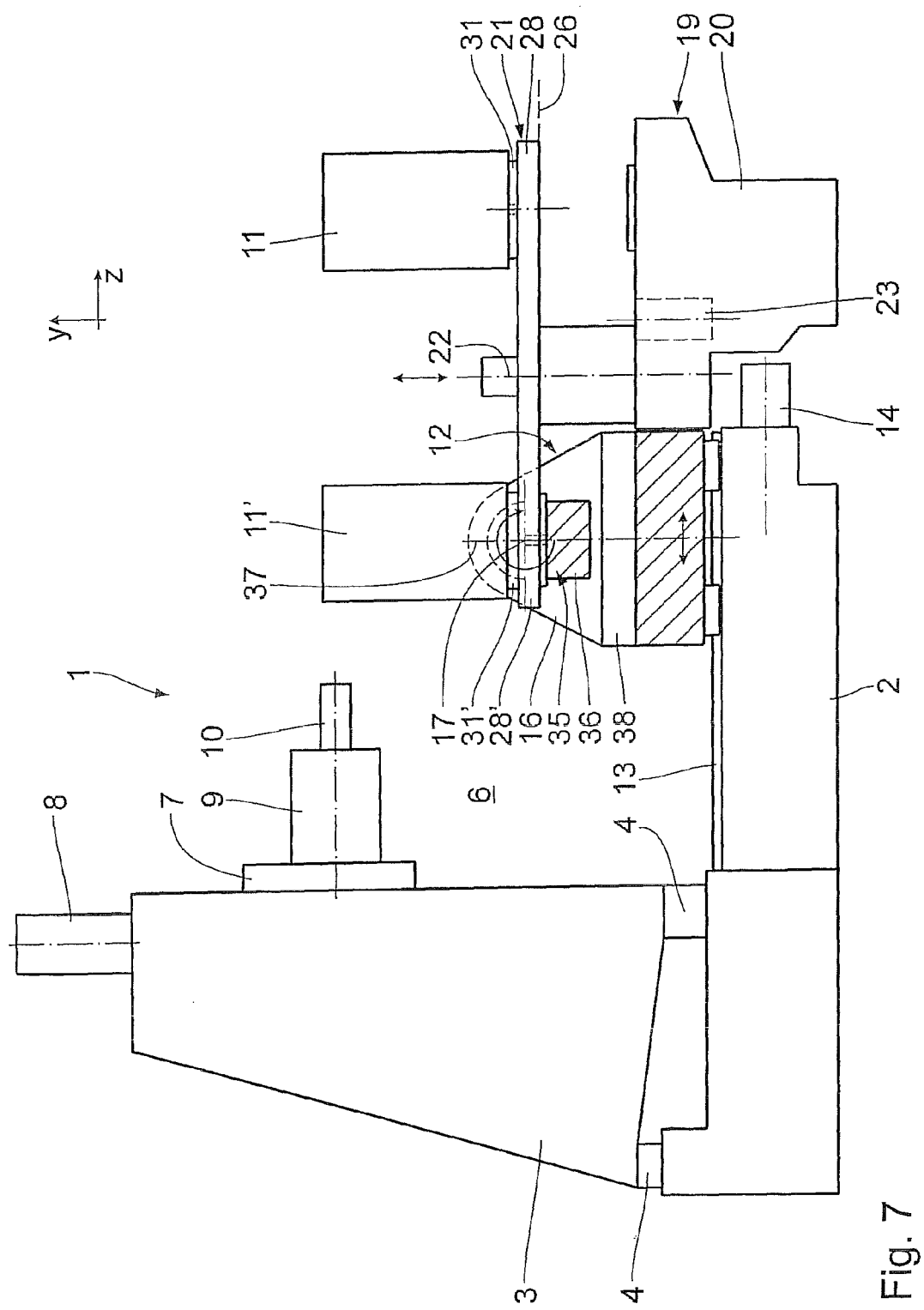
FIG. 7 shows the combination according to FIG. 1 at the end of a pallet change.

Thereafter, in accordance with the view in FIG. 6, the workpiece slide 12 is moved out of the overlap region with the pallet changing mechanism 21 in the direction of the stand 3. The pallet changing mechanism 21 is rotated through 180° by means of the y1-pivot drive 23, so the pair of arms 28' with the pallet 31' and the unmachined workpiece 11' is brought into a position facing the workpiece slide 12. Thereafter, the workpiece slide 12 is then again moved in the z-direction to the feed device 19 until the pair of arms 28' with the pallet 31' and the workpiece 11' to be machined is located above the swiveling table 15. The pallet changing mechanism 21 is moved down in accordance with FIG. 7 by means of the lift drive 24 into the central pallet depositing position 26, so the pallet 31' is deposited on the clamping mechanisms 34. The supports 29 are simultaneously lowered down to such an extent that the centering pins 32 of the pallet 31' are withdrawn from the centering bores 30 (see FIG. 5 in this regard). The workpiece slide 12 is moved with the workpiece 11' in the direction of the stand 3 until the pair of arms 28' is free of the workpiece slide 12. Thereafter, the pallet changing mechanism 21 is lowered into the lower feed and removal position 25, as shown in FIGS. 1 and 2. The machining of the workpiece 11' can begin, it being possible for the pair of arms 28' to enter the free space 38 below the swiveling table 15, as shown in FIGS. 1 and 2. Simultaneously, the machined workpiece 11 is removed from the pallet 31 and a new workpiece to be machined is deposited. The two pallets 31, 31' remain on the machine tool 1 or feed and removal device 19. Only workpieces 11' to be machined are deposited in each case and machined workpieces 11 removed.

What is claimed is:

1. A machine tool,
    with a tool spindle which is movable in a horizontal x-direction and a vertical y-direction,
    with a workpiece slide which is movable in a horizontal z-direction which is perpendicular to the x-direction and y-direction,
        which workpiece slide has a swiveling table which is pivotable about a horizontal A-axis which is parallel to the x-axis, and which swiveling table is designed to receive a workpiece pallet,
    with a feed and removal device,
        which feed and removal device has an H-shaped pallet changing mechanism which is pivotable about a y1-axis which is parallel to the vertical y-direction, and which H-shaped pallet-changing mechanism has two pairs of spaced apart and mutually parallel arms, which arms are provided with supports for a pallet,
        which feed and removal device has a y1-pivot drive for pivoting the pallet changing mechanism about the y1-axis, and
        which feed and removal device has a lift drive for displacing the pallet changing mechanism from a lower position into a central pallet depositing position and into an upper pallet lifting out position, and wherein the workpiece slide includes a free space which is formed below the swiveling table and which is formed to receive a part of a pair of the arms of the pallet changing mechanism in its lower position.

2. A machine tool according to claim 1, wherein centering pins and centering bores are provided to engage each pallet and the supports with one another.

3. A machine tool according to claim 2, wherein clamping mechanisms which are engageable with receivers on the pallets, are formed on the swiveling table.

4. A machine tool according to claim 1, wherein clamping mechanisms, which are engageable with receivers on the pallets, are formed on the swiveling table.

* * * * *